United States Patent
Fuchs

[15] 3,675,879
[45] July 11, 1972

[54] METHOD AND MEANS FOR CREATING ARTIFICIAL GRAVITY IN SPACECRAFT

[72] Inventor: Harry B. Fuchs, 242 Prospect St., Farmingdale, N.Y. 11735

[22] Filed: Sept. 2, 1969

[21] Appl. No.: 854,558

[52] U.S. Cl. ..........................................................244/1 SC
[51] Int. Cl. ...................................................B64g 1/00
[58] Field of Search.......................244/1 SS, 62; 310/5, 6, 7, 310/262 R, 262 E; 60/202; 55/103

[56] References Cited

UNITED STATES PATENTS

| | | | |
|---|---|---|---|
| 2,780,009 | 2/1957 | Stickel | 310/7 X |
| 3,047,748 | 7/1962 | Landsverk et al. | 310/7 |
| 3,095,167 | 6/1963 | Dudley | 244/62 |
| 3,424,401 | 1/1969 | Maurer | 244/1 SA |
| 3,246,239 | 4/1966 | Olney | 310/7 X |
| 3,534,926 | 10/1970 | Wuenscher | 244/1 SS |

*Primary Examiner*—Milton Buchler
*Assistant Examiner*—Jeffrey L. Forman

[57] ABSTRACT

Prolonged weightlessness in space congests the body organs of astronauts and is detrimental to the health thereof; while the discipline of physiotherapy teaches that electrostatic treatments decongest the body organs of human beings. An electrostatic generator at the underside of a floor in a space vehicle produces electrostatic energy which radiates from the topside thereof to attract astronauts in their footwear and clothing, and their implements, to the topside of the floor in simulation of natural gravity. The electrostatically-induced artificial gravity tends to minimize and offset the natural gravity differential effects on bodies in or on a space vehicle. An oppositely-turning rotor counters the torque reaction produced by a rotor forming part of the electrostatic generator. The oppositely-turning rotor also generates electric energy for useful purposes.

6 Claims, 3 Drawing Figures

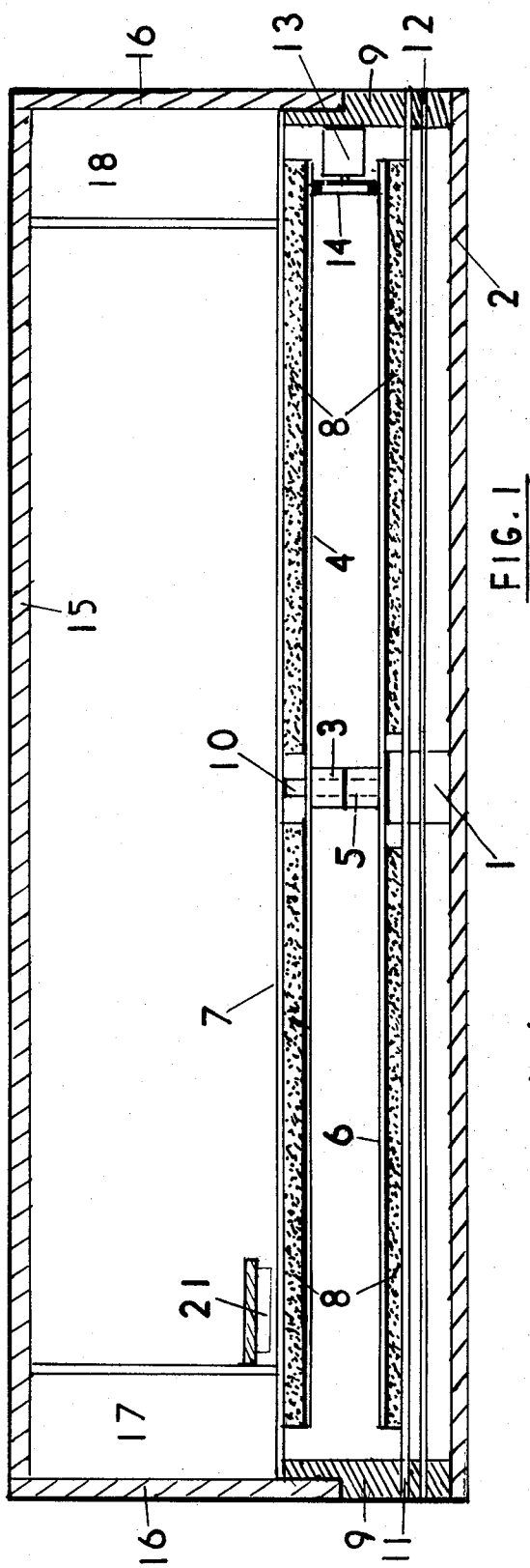
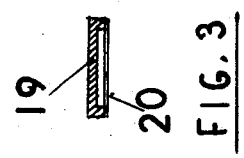

METHOD AND MEANS FOR CREATING ARTIFICIAL GRAVITY IN SPACECRAFT

My invention relates to method and means for creating artificial gravity in spacecraft such as space vehicles, transports, space stations and similar embodiments whereby the astronaut occupants thereof are attracted to and can walk on the floors of said embodiments without floating in a state of diminished natural gravity or weightlessness as heretofore, and it relates further to an improved method and means for countering torque reaction simultaneously with the generation of artificial gravity and the generation of electric energy by oppositely-turning co-axial rotors.

Diminished gravity and weightlessness are detrimental to the health of astronauts, particularly for long journeys in outer space. In such an ambient medium the hearts of astronauts are not required to pump as hard to circulate their blood as in the earth gravitational medium; and their reflexes are not called upon to help pump their blood back to their hearts against the force of gravity. Another significant effect of traveling and living in such an ambient medium is a deterioration in the condition of heart and blood vessels for which the medical term is "cardiovascular deconditioning."

Proposals have been made to provide artificial gravity in a space station by setting it spinning on its axis whereby centrifugal force would then give an outward gravity, and the "down" force comparable with earth gravity would be outward. That is impractical as the effect of centrifugal force acting along the length of a human body from head to feet is to draw the blood away from the eyes and brain, thereby causing blackouts.

Therefore, the prime object of my invention is to provide, particularly in an ambient medium of diminished gravity or weightlessness, an enclosure cabin complex for spacecraft wherein the floor, or other parts, of the enclosure or cabin complex radiates electrostatic energy to attract ambulatory entities and objects thereto in simulation of natural gravity.

Another object of my invention is to provide oppositely-turning co-axial rotors, one rotor being adapted to radiate attracting electrostatic energy for producing artificial gravity, indicated hereinbefore, to simulate natural gravity, and the other rotor being adapted to generate electric energy for useful purposes, both rotors being adapted to simultaneously counter torque reaction.

A further object of my invention is to provide gravitationally-stabilized orbiting space stations to deter FOBs. Such space stations can be assembled in orbit from sections launched by rockets to provide gravitationally-stable launching platforms where Earth gravity is already much diminished and the escape velocity reduced, and where spacecraft too big to take off from the Earth under their own power could be carried up to the space stations for assembly thereat and launching therefrom.

Other objects of my invention will be apparent from the ensuing specification and attached drawing wherein:

FIG. 1 is a schematic representation of an enclosure or cabin complex embodiment of my invention, forming part of a spacecraft, wherein a first rotor at the underside of a cabin floor generates electrostatic energy at the topside thereof to attract objects and entities thereto in simulation of natural gravity, and a second oppositely-turning co-axial rotor is adapted to generate electricity for useful purposes, such for example as propulsion of the spacecraft by reacting to the polarities of an electric force field surrounding the spacecraft, the said rotors also performing the additional function of countering the torque reaction of the spacecraft.

FIG. 2 is a schematic representation of a rotor, indicated in FIG. 1, having spaced friction pads secured to a side thereof.

FIG. 3 is a schematic representation of an electrostatically-attractable fabrication adapted to be fastened to the footwear, clothing, uniforms or equipment of astronauts whereby the astronauts will be attracted to the floor of the cabin indicated in FIG. 1, at angularity simulating natural gravity when the spacecraft is in an ambient medium of diminished gravity or weightlessness.

Referring to the schematic representation, in FIG. 1, of a cabin complex forming part of a spacecraft, space station, transport or other vehicle, which may be circular or of any other shape, the stationary central post 1 secured to the base 2 is a bearing supporting the hub 3 secured to rotor 4, and the hub 5 secured to rotor 6.

7 indicates a stationary sheet of plastics or other material adapted to radiate electrostatic energy when frictionally excited by the pads 8 secured to the rotor 4.

The sheet 7 is a floor of a spacecraft cabin, supported at its periphery by multiple insulating posts 9, and at the center thereof by an extension 10 of post 1. A continuous circumferential structure may be substituted for the multiple posts 9 as is well-known to those skilled in the art.

The pads 8 secured to the underside of rotor 6 are adapted to frictionally excite the stationary plastics or equivalent sheet 11 for generating clouds of electrons that are absorbed by the stationary electrically-conductive element such as the sheet 12 or equivalent. Both elements 11 and 12 are supported by the insulating posts 9 or equivalents, and are separated from one another as shown.

Upon the energization of the electric motor 13 from a source of electric current, the pulley or gear thereof, indicated by 14, simultaneously engages and rotates the rotors 4 and 6 in opposite directions, whereupon the frictional excitation of the underside of floor 7 by the pads 8 causes the topside thereof to radiate electrostatic clouds of electrons which function as artificial gravity by attracting objects thereto in simulation of natural gravity; and the concurrent frictional excitation of element 11 by the other pads 8 secured to rotor 6 generates clouds of electrons that are absorbed by the electrically-conductive element 12 for channeling to useful purposes; and the oppositely-turned rotors 4 and 6 also perform the additional very important function of cancelling the torque reaction of the co-axial rotors.

15 indicates the ceiling of the cabin, supported by the circumferentially-continuous wall 16 mounted on the posts 9 or equivalent circumferentially-continuous structure. 17 and 18 represent compartments for containing equipment, instrumentation, and/or supplies.

The schematic representation in FIG. 3 comprises a base 19 of insulating material and an electrostatically-attractable element 20, such as of sheet aluminum or equivalent, partly secured thereto and having a portion thereof spaced from the base 19. This parallel structure of different materials is adapted to be fastened to the footwear, clothing, and implements of astronauts traversing the floor 7 of a spacecraft cabin whereby the electrostatic energy radiating from the floor 7 will pull and attract one side of the element 20 thereto, thus providing artificial gravitational pull on the astronauts similar to natural gravity, part of the other side of the element 20 being spaced from the base 19. I have also obtained satisfactory experimental results when the element 20 was of aluminized fiberboard.

It will be noted, in FIG. 1, that one side of the stationary sheet 7 is the floor radiating electrostatic energy into the cabin, which presumably is pressurized with life-supporting air or oxygen, while the underside thereof is the source for generating the electrostatic energy; and it will be understood that the belt of a Van de Graaff electrostatic generator may be used as an equivalent for energizing the sheet 7.

21 indicates an electrically-conductive element supported by an insulating element secured to the wall of compartment 17, as shown in FIG. 1, but may be positioned over any portion of the electrostatically-radiating floor 7 and separated therefrom like element 12 is separated from element 11. Upon the energization of element 7 by the pads 8, the resulting electrostatic current will be absorbed by element 21 and may be used to light a fluorescent lamp in circuit therewith and with a slip-ring contact from the rotating pads 8, as I have determined experimentally.

It will also be noted that while the cabin is pressurized with life-supporting aeriform gas, the near-vacuum medium surrounding a spacecraft in outer space is beneficial for the operation of the generators in the compartment at the underside of sheet 7.

Co-polymer plastics may be used in the construction of the cabin complex. Such plastics can be reenforced with glass fibers and cloth and formed into structural members. Co-polymers are also suitable as adhesives for bonding to metals.

Although only certain embodiments of my invention have been illustrated and described herein as examples, it is understood that changes and modifications may be made within the scope of the claims appended hereto.

I claim:

1. The method of creating artificial gravity in a spacecraft traversing space in an ambient medium of diminished gravity, which consists in frictionally exciting the underside of a floor in a spacecraft to radiate electrostatic energy from the topside thereof, and placing an electrostatically-attractable element adjacent thereto whereby one side thereof will be attracted to the said topside of the floor.

2. In a spacecraft adapted to traverse outer space in an ambient medium of diminished gravity, a stationary floor, a first rotor at the underside of the floor adapted to radiate electrostatic energy from the topside thereof to provide artificial gravity by attracting the footwear and other equipment of astronauts, and a second oppositely-turning rotor adapted to cooperate with the first rotor to counter torque reaction.

3. Means for creating artificial gravity in an ambient medium of diminished gravity comprising a base adapted to be fastened to the footwear and equipment of astronauts, an electrostatically-attractive planiform element secured to the base, a sheet adapted to produce electrostatic energy in response to frictional excitation, a first surface of the sheet adapted to attract the said electrostatically-attractive planiform element, and frictional means associated with the opposite surface of the sheet adapted to generate the electrostatic energy whereby the said first surface will radiate the electrostatic energy and attract the planiform element thereto.

4. Means for creating artificial gravity in an ambient medium of diminished natural gravity, comprising an electrostatically-attractable element forming part of a fabricated article adapted to be fastened to the footwear and equipment of astronauts, one side of the said electrostatically-attractable element adapted to be attracted by one side of an electrostatically-charged sheet, the other side of the said element being partly integral with the fabricated article, and means for electrostatically charging the other side of the said sheet whereby the said one side of the sheet will attract the said one side of the element to provide artificial gravitational attraction.

5. In a spacecraft adapted to travel in a near-vacuum in space, an enclosure having a ceiling and a floor and adapted to be pressurized therein with life-supporting aeriform gas, an electrostatic generator at the underside of the floor adapted to be exposed to the near-vacuum medium for the beneficial operation thereof, and means for actuating the electrostatic generator whereby the energy generated thereby will radiate from the topside of the floor within the enclosure and attract objects thereto in simulation of natural gravity.

6. In a spacecraft adapted to travel in a medium of diminished natural gravity, the combination and interrelation of a stationary floor, a bearing at the underside of the floor supporting a rotor part of an electrostatic generator, the said rotor being positioned substantially parallel to the stationary floor, and means associated with the rotor adapted to excite the underside of the stationary floor whereby the topside thereof will radiate electrostatic energy to attract objects thereto in simulation of natural gravity.

* * * * *